United States Patent [19]

Yokoi et al.

[11] Patent Number: 4,843,708
[45] Date of Patent: Jul. 4, 1989

[54] ASSEMBLY METHOD FOR COMPONENT PARTS AND SYSTEM

[75] Inventors: Yoshihiko Yokoi, Tochigi; Kazuo Kawai, Yokohama; Youkichi Onda, Utsunomiya; Masaki Mochizuki, Tochigi, all of Japan

[73] Assignee: Nissan Motor Co., Ltd., Yokohama, Japan

[21] Appl. No.: 183,982

[22] Filed: Apr. 20, 1988

[30] Foreign Application Priority Data

Apr. 23, 1987 [JP] Japan ............................. 62-100758
Apr. 23, 1987 [JP] Japan ............................. 62-100759

[51] Int. Cl.$^4$ .......................................... B23Q 17/00
[52] U.S. Cl. ....................................... 29/407; 29/469; 29/156.4 R; 29/703; 29/720
[58] Field of Search ............... 29/156.4 R, 407, 469, 29/701, 702, 703, 709, 720

[56] References Cited

U.S. PATENT DOCUMENTS 4,715,772 12/1987 Kanayama .................... 29/720 X

FOREIGN PATENT DOCUMENTS 59-73374 4/1984 Japan .

Primary Examiner—Timothy V. Eley
Attorney, Agent, or Firm—Foley & Lardner, Schwartz, Jeffery, Schwaab, Mack, Blumenthal & Evans

[57] ABSTRACT

An assembly method for an automotive engine and a transmission to provide a power unit. The assembly method is carried out as follows: The engine and the transmission are supported respectively on respective lifter tables which are controllably movable to change the location of the engine and the transmission in accordance with a location correction command fed thereto. The engine and transmission are provided at their joining faces with joining standards, respectively. Then, a pair of CCD cameras are inserted into between the joining faces of the engine and transmission to pick up the images of the respective joining standards. The thus picked-up images of the joining standards are processed by a processor to detect the positions of the joining standards and provide the location correction command to at least one of the lifter tables, so that at least one of the locations of the engine and the transmission is changed to cause the joining standards to coincide with each other. Thereafter, the joining faces of the engine and the transmission are joined each other to assemble the power unit, thus facilitating automatic assembly operation of the power unit with a high precision.

17 Claims, 7 Drawing Sheets

FIG. 9
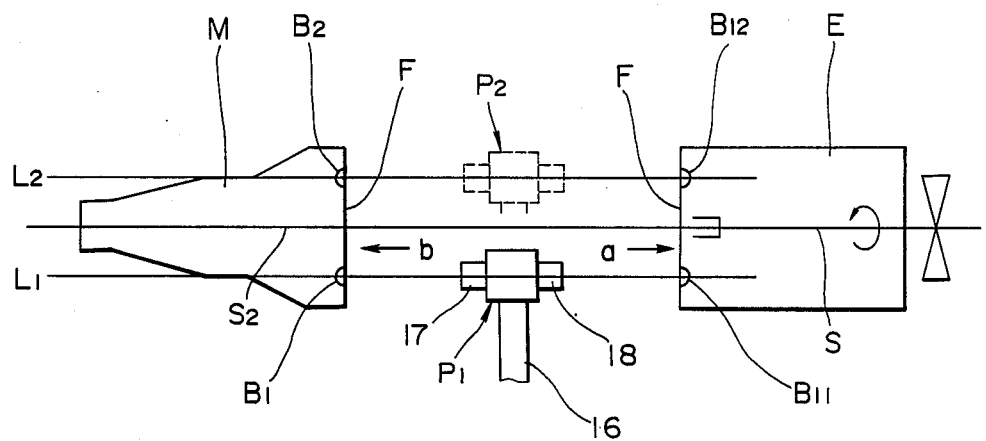
FIG. 10  FIG. 11
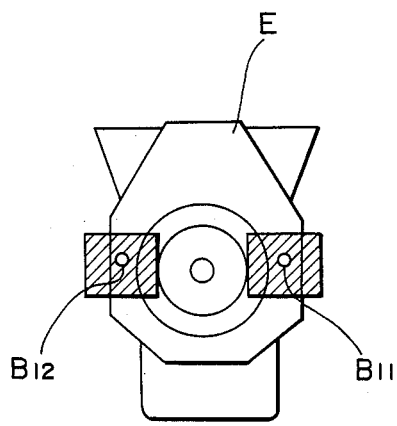 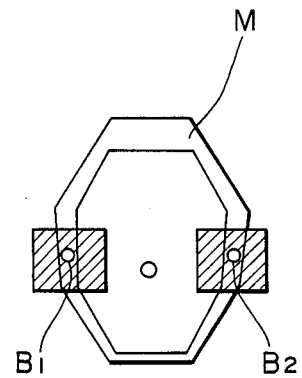

4,843,708

ASSEMBLY METHOD FOR COMPONENT PARTS AND SYSTEM

BACKGROUND OF THE INVENTION

1. Field of the Invention

This invention relates to improvements in a method for assembling two component parts such as an engine and a transmission of an automotive vehicle, and more particularly to such an assembly method for automatically regulating the locations of the two parts so that joining standards of the two parts are brought into coincidence with each other before joining the two component parts.

2. Description of Prior Art

In order to assemble an engine and a transmission of an automotive vehicle, it has been extensively carried out that an operator changes the location of the transmission relative to the previously located engine thereby to join them. However, in this assembly method, the operator must repeatedly change the location of the transmission making this trial and error thereby to find a suitable joining position of the transmission. This requires operator's skill and a relatively long operation time.

Another assembly method is disclosed in Japanese Patent Provisional Publication No. 59-73374, in which rotational phase matching operation between the rotational members of the engine and the transmission is made by a contacting type phase matching device. This assembly method contributes to labor saving but requires a relatively long time to complete a phase matching operation. Additionally, in this assembly method, attention is focused only on location matching in rotational direction on the premise that axes of the engine and the transmission are aligned with each other. Accordingly, location of the engine and the transmission before the phase matching requires a high precision, and therefore troubles are raised even if there is only a little dislocation in the joining faces of the engine and the transmission.

SUMMARY OF THE INVENTION

An assembly method of the present invention is carried out to assemble first and second component parts as follows: Firstly, the first and second component parts are supported respectively to first and second support means in such a manner that joining faces of the first and second component parts face each other. The first and second support means are adapted to be controllably movable in response to a location correction command fed thereto. In this connection, first and second joining standards are formed respectively on the joining faces of the first and second component parts. Secondly, first and second cameras are located in a space between the joining faces of the first and second component parts. The first and second cameras are located in a space between the joining faces of the first and second component parts. The first and second cameras are positioned on the same axis. Thirdly, the images of the first and second joining standards are picked up respectively by first and second cameras thereby to detect positions of the first and second joining standards. Fourthly, the location correction command is provided to at least one of the first and second support means in response to the detected positions of the first and second joining standards, thereby to cause the first and second joining standard positions to coincide with each other. Finally, the joining faces of the first and second component parts are joined with each other upon coincidence of the first and second joining standards.

Thus, according to the present invention, the corresponding joining standards formed on the joining faces of the two component parts to be assembled are recognized by the two cameras positioned on the same axis, and therefore correction of relative location between the two component parts can be automatically accomplished thereby achieving high precision assembly operation while shortening the cycle time of the assembly operation. Additionally, if the location correction command is fed back to a bolt installation and tightening device, assembly operation including bolt installation and tightening can be completely unmanned.

BRIEF DESCRIPTION OF THE DRAWINGS

FIG. 9 is a schematic illustration of the assembly system of FIG. 1 for the purpose of explaining the assembly method of the present invention;

FIG. 10 is a view taken in the direction of an arrow a of FIG. 9;

FIG. 11 is a view taken in the direction of an arrow b of FIG. 9; and

DETAILED DESCRIPTION OF THE INVENTION

Figure 1:
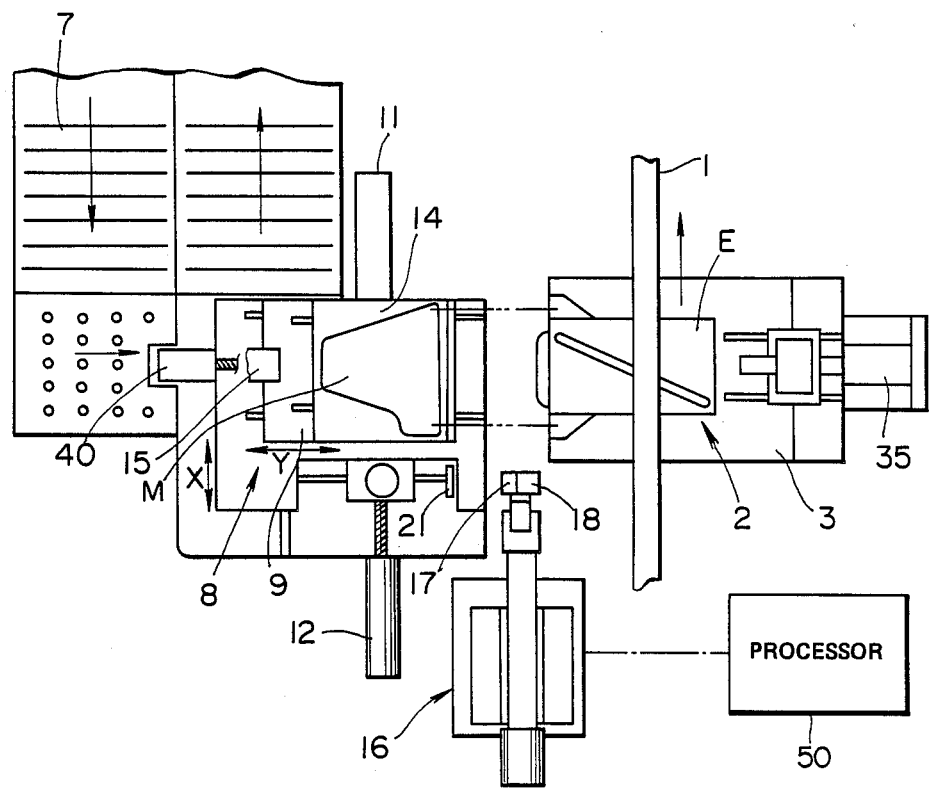
FIG. 1 is a plan view of an essential part of an assembly system to which an assembly method according to the present invention is applied.
Figure 2:
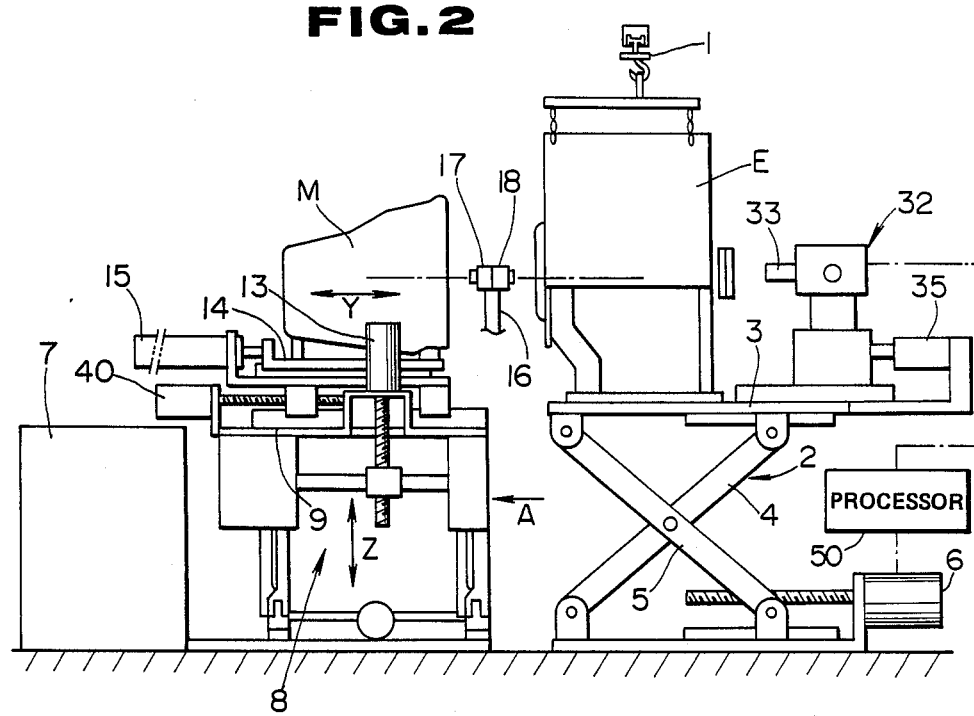
FIG. 2 is a front view of the assembly system of FIG. 1.
Figure 3:
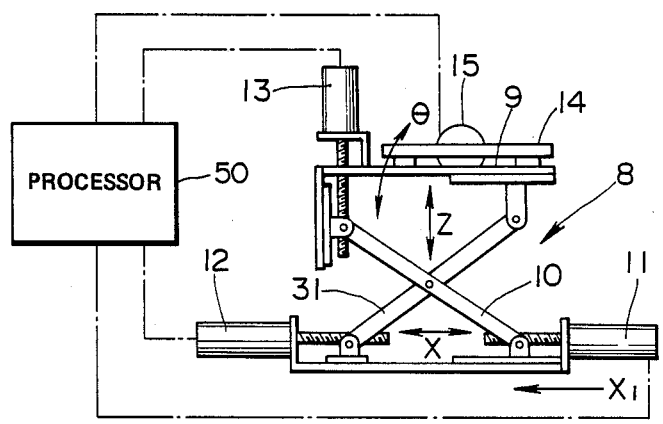
FIG. 3 is a view taken in the direction of an arrow A.

Referring now to FIG. 1 to 3, there is shown an embodiment of a system for assembling two component parts, to which an assembly method according to the present invention is applied. In this embodiment the component parts are an engine E and a transmission T, respectively, which are operatively joined to provide a power unit. Accordingly, the assembly method of the present invention will be discussed hereinafter exemplifying the case of assemblying the power unit including the engine E and the transmission T.

The engine E having been carried by an overhead conveyor 1 is transferred and is mounted on a lifter table 3 of a lifter 2 upon lifting motion of the lifter 2. The lifter table 3 is adapted to ascend and descend upon moving horizontally the lower end of a link 5 of a link mechanism including a link 4 by a motor 6. Similarly, the transmission M having being carried by a conveyor 7 is transferred and is mounted on a lifter table 9 of a lifter 8 by a transferring lifter (not shown). The lifter table 9 ascends and descends upon horizontally moving the lower end section of a link 10 of a link mechanism including a link 31 by a motor 11. When the lower end sections of the links 10, 31 are simultaneously moved in a direction $X_1$, the lifter table 9 itself can move horizontally. Further, the lifter table 9 can be moved to change its inclination in a direction $\theta$ by operating a motor 13, and moved to change its location in a direction Y by operating a motor 40. Thus, the lifter table 3 can move in the direction Z while the lifter table 9 can move in the directions Z, X, Y and $\theta$. A slide table 14 is movably disposed above the lifter table 9 and slidable in the direction Y by operating an air cylinder 15.

Figure 6:
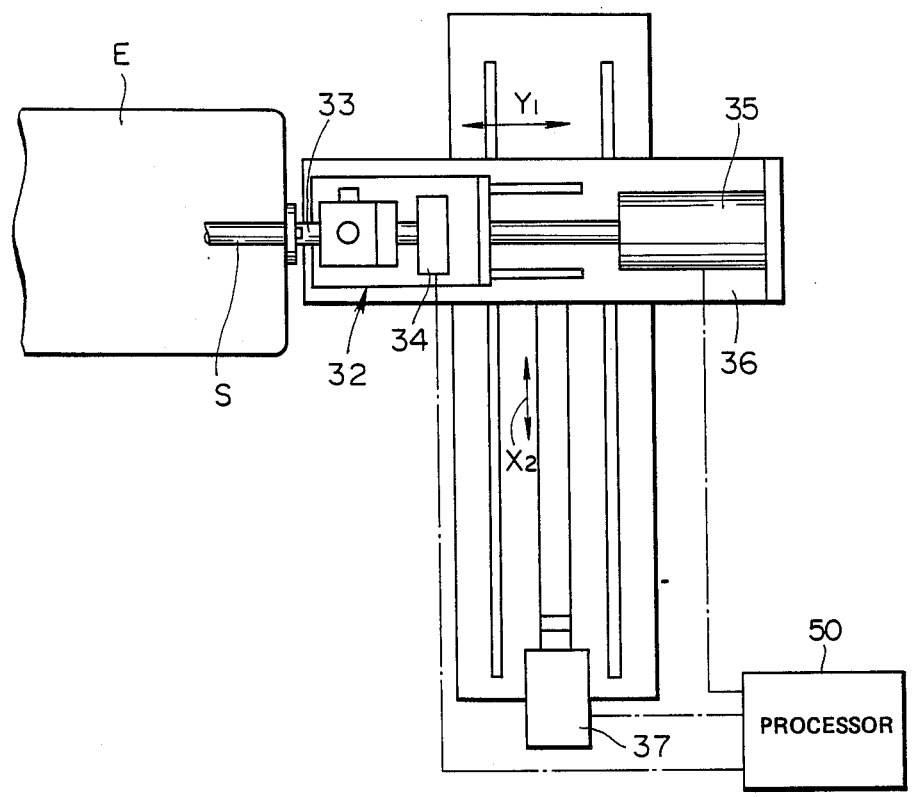
FIG. 6 is a fragmentary enlarged view of a part of the assembly system of FIG. 1.

A drive unit 32 is mounted on the lifter table 3 supporting thereon the engine E and adapted to rotate a crankshaft S of the engine E. As shown in FIG. 6, the drive shaft 32 includes a socket 33 which is engageable with an end section of the crankshaft S to rotate the crankshaft S at a low speed. The socket 33 is drivably connected to an air motor 34 for rotating the socket 33. The drive unit 32 itself can move forward and backward in a direction $Y_1$ under the action of an air cylinder 35. Additionally, a table 36 on which the drive unit 32 is mounted can move in a direction $X_2$ under the action of a motor 37.

Figure 4:
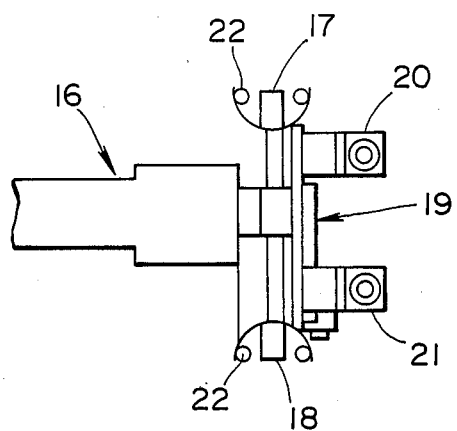
FIG. 4 is a plan view of a hand of a robot used in the assembly system of FIG. 1.
Figure 5:
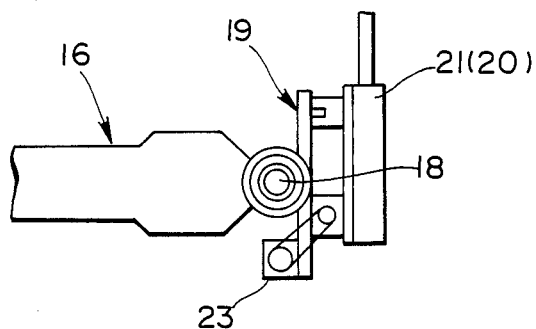
FIG. 5 is a front view of the robot hand of FIG. 4.

A joint type industrial robot 16 is provided to be controllably movable and has a hand 19 as shown in FIGS. 4 and 5. The hand 19 is provided with first and second CCD cameras 17, 18 (referred hereafter simply as "cameras") which are oppositely directed and located on the same axis. In other words, the first and second cameras 17, 18 respectively face the transmission M and the engine E when positioned between the transmission M and the engine E as shown in FIG. 2. Additionally, the axes of the first and second cameras 17, 18 are aligned with each other. The robot 16 serves also as means for installing and fastening bolt as discussed in detail after, and therefore the robot hand 19 is provided with a pair of nut runners 20, 21. The reference numeral 22 denotes a light source for lightening.

Next, an example of the assembly method of the present invention will be discussed hereinafter with reference to a flow chart of FIG. 8 and the schematic illustrations of FIGS. 9 to 12.

Figure 8:
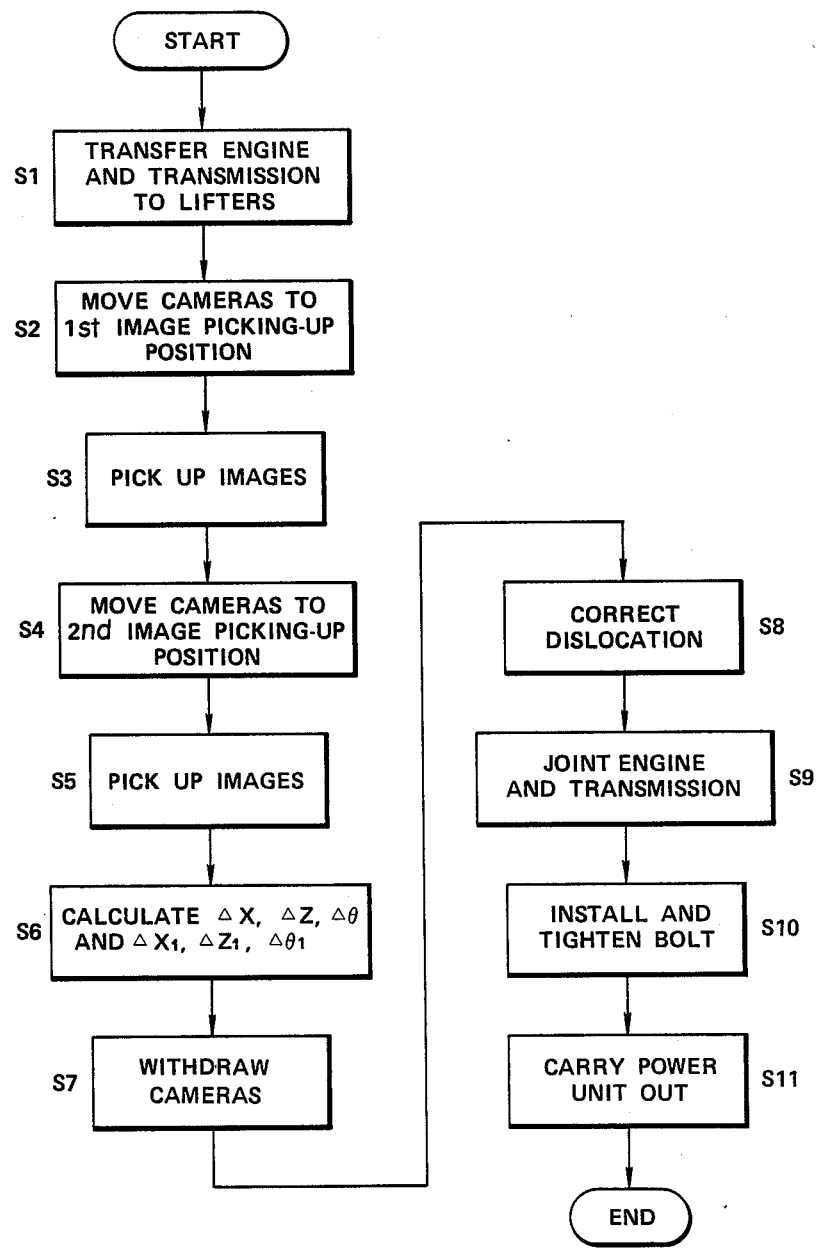
FIG. 8 is a flow chart showing an example of the assembly method of the present invention in connection with the assembly system of FIG. 1.
Figure 12:
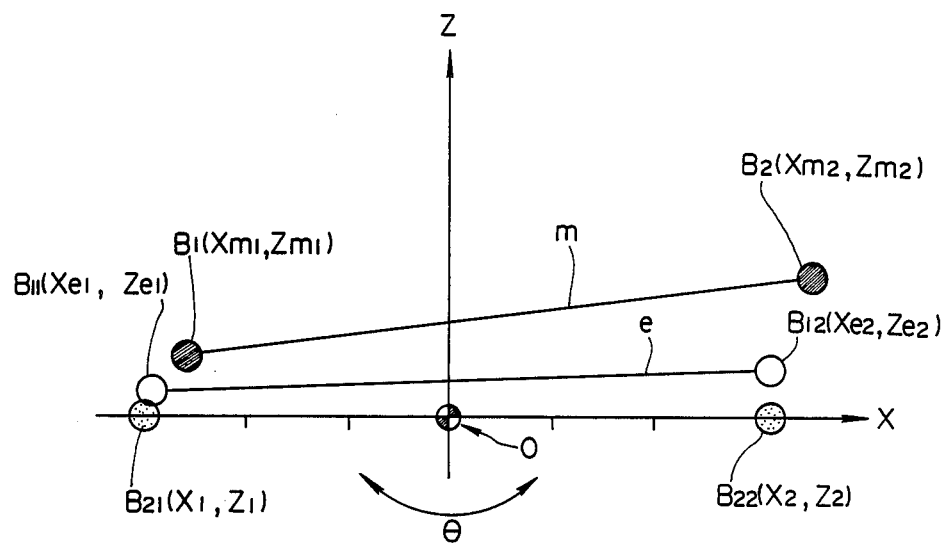
FIG. 12 is a graph showing a manner of processing images of joining standards picked up by cameras used in the assembly system of FIG. 1.

First, the engine E and the transmission M are located in position respectively on the lifters 2, 8 (See a step S1 of FIG. 8). Meanwhile, information for the engine E and the transmission M has been provided from a production indication computer (not shown). The robot 16 causes the first and second cameras 17, 18 to be positioned into a first image picking-up position $P_1$ in a space between the engine E and the transmission M as shown in FIG. 9 (See a step S2 of FIG. 8). At the point $P_1$, the first and second cameras 17, 18 are generally on an axis $L_1$ passing through bolt holes $B_1$, $B_{11}$ which correspond to each other and respectively positioned in the joining faces F, F of the transmission M and the engine E. Then, the first and second cameras 17, 18 simultaneously pick up the images of the bolt holes (first joining standards) $B_1$, $B_{11}$, respectively as shown in FIGS. 10 and 11 (See a step S3 of FIG. 8). The thus picked-up images of bolt holes $B_1$, $B_{11}$ are analyzed by a processor or control circuit 50 thereby to calculate coordinates $X_{m1}$, $Z_{m1}$), $(X_{e1}, Z_{e1})$ of each bolt hole $B_1$, $B_{11}$ and memorize them as illustrated in FIG. 12. More specifically, the circle of contour of each bolt hole $B_1$, $B_{11}$ is extracted from the image picked up by the camera 17, 18, and thereafter the location of the center of the circle is determined to obtain the value of the above-mentioned coordinates $(X_{m1}, Z_{m1})$, $(X_{e1}, Z_{e1})$.

In this case, a common origin O of the coordinates has been previously set for robot operation and visual correction as shown in FIG. 12. Accordingly, if the locations of the origins or standard positions of the first and second cameras 17, 18 are coincident with the common origin O, the origin of the coordinates $(X_{m1}, Z_{m1})$ and the coordinates $(X_{e1}, Z_{e1})$ corresponds to the above-mentioned common origin O.

Subsequently, the robot 16 causes the first and second cameras 17, 18 to be positioned into a second image picking-up position $P_2$ in the space between the transmission M and the engine E as shown in FIG. 9 (See a step S4 of FIG. 80). At the point $P_2$, the first and second cameras 17, 18 are generally on an axis $L_2$ passing through bolt holes $B_2$, $B_{12}$ which correspond to each other and respectively positioned in the joining faces F, F of the transmission M and the engine E. Then, the first and second cameras 17, 18 pick up the images of the bolt holes (second joining standards) $B_2$, $B_{12}$, respectively, as shown in FIGS. 10 and 11 (See a step S5 of FIG. 8). The thus picked-up images of the bolt holes $B_2$, $B_{12}$ are analyzed by the processor 50 thereby to calculate and memorize the coordinates $(X_{m2}, Z_{m2})$, $(X_{e2}, Z_{e2})$ of each bolt hole $B_2$, $B_{12}$ as illustrated in FIG. 12 (See a step S6 of FIG. 8).

When the operation of picking-up of the images of the bolt holes $B_2$, $B_{12}$ is completed, the robot 16 causes the first and second cameras 17, 18 to be withdrawn from the space between the transmission M and the engine E and located into a position to carry out fastening bolt operation (See step S7 of FIG. 8). In this state, the first and second cameras 17, 18 are standing by ready. Meanwhile, the processor 50 calculates a relative location error (or dislocation amount) between the bolt holes $B_1$, $B_{11}$ and between the bolt holes $B_2$, $B_{12}$ in accordance with the above-memorized coordinates $(X_{m1}, Z_{m1})$, $(X_{m2}, Z_{m2})$, and $(X_{e2}, Z_{e2})$. In other words, as shown in FIG. 12, assuming that the locations of the two bolt holes $B_{11}$, $B_{12}$ on the side of the engine E are connected by a line e while the locations of the two bolt holes $B_1$, $B_{12}$ are connected by a line m, calculation is made to obtain three correction amounts $\Delta X$, $\Delta Z$ and $\Delta \theta$ respectively in the directions X, Z and $\theta$ in FIG. 12 which correction amounts are required to superpose the line m on the line e.

Furthermore, to the side of the robot 16, teaching of standard bolt hole positions $B_{21}$, $B_{22}$ has been previously made in order to carry out bolt installation and fastening operation for the corresponding bolt holes $B_1$, $B_{11}$ and the corresponding bolt holes $B_2$, $B_{12}$. In this connection, apart from calculation of the above-mentioned correction amounts, another calculation is made to obtain further three correction amounts $\Delta X_1$, $\Delta Z_1$ and $\Delta \theta_1$ respectively in the directions X, Z and $\theta$ in FIG. 12 which correction amounts are required to allow the bolt holes $B_{11}$, $B_{12}$ on the engine E side to coincide respectively with the standard bolt hole positions $B_{21}$, $B_{22}$.

Subsequently, the above-mentioned correction amounts $\Delta X$, $\Delta Z$ and $\Delta \theta$ are provided as a correction command to a controller (may be a part of a processor 50) of the lifter 8 including the motors 11, 12, 13. This correction command is provided as deviation data for previously provided locational data. In other words, motors 11, 12, 13 are controlled in accordance with the correction command supplied to the controller. The location of the transmission M in the direction X is corrected by the motors 11, 12. The location of the transmission M is corrected by the motors 11, 12. The location of the transmission M in the direction Z is corrected by the motor 11. Additionally, the location of the transmission M in the direction $\theta$ is corrected by the motor 13. Accordingly, the locations of the bolt holes $B_1$, $B_2$ on the transmission M side are brought into coincidence with the locations of the bolt holes $\dot{B}_{11}$, $B_{12}$ on the engine E side, respectively (See a step S8 of FIG. 8).

Figure 7:
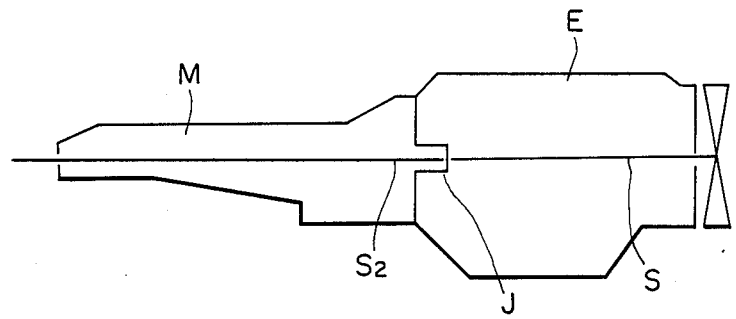
FIG. 7 is a schematic illustration of a power unit in an assembled state.

Then, the transmission M is forwardly moved in the direction Y under the action of the air cylinder 15. As a result, the joining faces F, F of the transmission M and the engine E are brought into tight contact with each other as shown in FIG. 7 so that a crank shaft S of the engine E is in engagement with an input shaft $S_2$ of the transmission M to form a joint J (See a step S9 of FIG. 8).

In cases where the transmission M is a manual transmission, the table 36 in FIG. 6 is standing ready in a position shown in the same figure prior to the forward movement of the transmission M. Then, the drive unit 32 is forwardly moved under the action of the air cylinder 35 simultaneously with the forward movement of the transmission M, so that its socket 33 is brought into engagement with the end section of the crankshaft S of the engine E. During this, the engine crankshaft S is compulsorily slowly rotated under the action of the air motor 34. In other words, during joining the joining faces of the engine E and the transmission M, the crankshaft S is rotated simultaneously so that the splines of the engine crankshaft S can be smoothly fitted or engaged with the splines of a transmission input shaft $S_2$ as shown in FIG. 7. This engagement of the splines of the engine crankshaft S and the transmission input shaft $S_2$ is further facilitated by variably controlling the pressure of the air cylinder 15 for pushing the transmission M.

In this condition, the robot 16 is again operated to install bolts previously inserted into the nut runners 20, 21 into the bolt holes $B_1$ ($B_{12}$), $B_2$ ($B_{12}$) and tighten them thereby to join or assemble the engine E and the transmission M into the power unit (See a step S10 of FIG. 8). In this time, before the above-operation of bolt installation and tightening, the location of the robot 16 is corrected by the above-mentioned correction amounts $\Delta X_1$, $\Delta Z_1$ and $\Delta \theta_1$ so that the bolt installation and tightening operation is effectively achieved. The thus assembled power unit is carried out of the assembly system (See a step S11 of FIG. 8). It will be understood that the bolt holes $B_1$ ($B_{11}$), $B_2$ ($B_{12}$) are different in thread pitch depending upon kinds of the engine E and the transmission M, and therefore the nut runners 20, 21 are adapted to be variable in their thread pitch under the action of a motor 23 as shown in FIG. 5.

Here, in the above-discussed assembly system, the location of the first and second cameras 17, 18 may be accidentally shifted owing to failed installation of the cameras or the like, and therefore recognition is unavoidably made as dislocation of an object to be detected thereby making impossible to carry out normal operation of the system. In view of this, this system is configured as follows: The cameras 17, 18 are brought into a separate check point before reaching the first image picking-up position. At this separate check point, the cameras 17, 18 pick up the image of a mark on a stationary member, so that the picked-up image is processed thereby to memorize the coordinates of the mark which has been first picked up and processed. Additionally, such picking-up and processing of the image of the mark is executed in each operational cycle of the robot 16 to obtain the coordinates of the mark, upon which watching is made comparing the thus obtained coordinates of the mark with the previously memorized coordinates of the mark to obtain a dislocation amount therebetween. Then, the coordinates of the object to be detected at the first and second image picking-up points $P_1$, $P_2$ are corrected in accordance with the thus detected dislocation amount, thereby removing problems due to dislocation of the cameras 17, 18.

What is claimed is:

1. A assembly method for two component parts, comprising:

supporting first and second component parts respectively to first and second support means in such a manner that joining faces of said first and second component parts face each other, said first and second support means being adapted to be controllably movable in accordance with a location correction command fed thereto, first and second joining standards being formed respectively on the joining faces of said first and second component parts;

locating first and second cameras in a space between said first component part joining face and said second component part joining face, said first and second cameras being positioned on the same axis;

picking up images of said first and second joining standards respectively by said first and second cameras to detect positions of said first and second joining standards; and providing the location correction command to at least one of said first and second support means in response to the detected positions of said first and second joining standards, to bring the first and second joining standard positions into coincidence with each other; and joining the joining faces of said first and second component parts with each other upon coincidence of said first and second joining standards.

2. An assembly method as claimed in claim 1, further comprising the step of inserting a bolt into corresponding bolt holes of said respective first and second component parts and fastening it.

3. An assembly method as claimed in claim 2, wherein the first and second cameras locating step and said bolt inserting and fastening step are carried out by an industrial robot, said bolt holes corresponding to said first and second joining standards.

4. An assembly method as claimed in claim 2, further comprising teaching said robot a standard position of a bolt hole in which the bolt is to be inserted, and calculating an amount of dislocation of said standard position from said one of said first and second joining standard, and changing location of said robot in accordance with said dislocation amount.

5. An assembly method as claimed in claim 1, said command providing step includes calculating an amount of dislocation between said first and second joining standard positions in accordance with the detected positions of said first and second joining standards, and producing the location correction command in response to the dislocation amount.

6. An assembly method as claimed in claim 1, further comprising correcting any dislocation of said first and second cameras themselves from their standard positions.

7. An assembly method as claimed in claim 6, wherein said dislocation correcting step includes picking up an image of a standard mark by at least one of said first and second cameras to memorize position of said standard mark, and repeatedly carrying out the picking-up of the image of said standard mark per an operational cycle of said robot to detect position of said standard mark, and comparing the detected position of said standard mark with the memorized position of said standard mark to obtain an amount of dislocation therebetween, and correcting dislocation of said first and second cameras in accordance with said dislocation amount between said standard mark detected position and memorized position.

8. An assembly method for an engine and a transmission, comprising:
supporting the engine and the transmission respectively to first and second support means in such a manner that joining faces of the engine and transmission face each other, said first and second support means being adapted to be controllably movable in accordance with a location correction command fed thereto, first and second joining standards being formed respectively on the joining faces of the engine and the transmission;
locating first and second cameras in a space between the engine joining face and the transmission joining face, said first and second cameras being positioned on the same axis;
picking up images of said first and second joining standards respectively by said first and second joining standards respectively by said first and second cameras to detect positions of said first and second joining standards;
providing the location correction command to at least one of said first and second support means in accordance with the detected positions of said first and second joining standards, to bring said first and second joining standard positions into coincidence with each other; and
joining the joining faces of said engine and said transmission upon coincidence of said first and second joining standards, said joining step including rotating a crankshaft of the engine to smoothly engage with an input shaft of the transmission.

9. A system as claimed in claim 8, further comprising means for inserting a bolt into first and second bolt holes formed respectively in the joining faces of said first and second component parts and for fastening it upon joining the joining faces.

10. A system as claimed in claim 9, wherein said bolt holes correspond to said first and second joining standards.

11. A system as claimed in claim 9, wherein said first and second cameras and said bolt inserting and fastening means form part of an industrial robot.

12. A system as claimed in claim 10, further comprising means for teaching said robot a standard position of a bolt hole in which the bolt is to be inserted, and means for calculating an amount of dislocation of said standard position from said one of said first and second joining standards, and means for changing location of said robot in accordance with said dislocation amount.

13. A system as claimed in claim 10, further comprising means for correcting dislocation of said first and second cameras from their standard positions.

14. A system as claimed in claim 13, wherein said dislocation correcting means includes means for picking up an image of a standard mark by at least one of said first and second cameras to memorize position of said standard mark, means for repeatedly carrying out the picking-up of the image of said standard mark per an operational cycle of said robot to detect position of said standard mark, means for comparing the detected position of said standard mark with the memorized position of said standard mark to obtain dislocation therebetween, and means for correcting dislocation of said first and second cameras in accordance with said dislocation amount between said standard mark detected position and memorized position.

15. A system as claimed in claim 10, wherein said first and second component parts are respectively an engine having a crankshaft and a transmission having an input shaft, wherein said joining means includes means for rotating said engine crankshaft to smoothly engage with the transmission input shaft.

16. A system for assembling first and second component parts, comprising:
first and second support means for respectively supporting first and second component parts in such a manner that joining faces of said first and second component parts face each other, first and second supporting means including respectively first location changing means for changing location of said first component part in accordance with a location correction command signal fed thereto, and a second location changing means for changing location of said second component part in response to the location correction command signal fed thereto;
means defining first and second joining standards respectively on the joining faces of said first and second component parts;
first and second cameras which are positioned on the same axis;
means for moving said first and second cameras into a space between the joining faces of said first and second component parts to pick up images of said first and second joining standards respectively so as to detect positions of said first and second joining standards;
means for producing the location correction command signal in response to the detected positions of said first and second joining standards and providing it to at least one of said first and second location changing means to bring said first and second joining standards into coincidence with each other; and
means for joining the joining faces of said first and second component parts upon coincidence of said first and second joining standards.

17. A system as claimed in claim 16, wherein said location correction command signal producing and providing means includes means for calculating an amount of dislocation between said first and second joining standards in accordance with the detected positions of said first and second joining standards, and means for producing the location correction command signal in accordance with said dislocation amount.

* * * * *